US008860893B2

(12) United States Patent
Kawashima

(10) Patent No.: US 8,860,893 B2
(45) Date of Patent: Oct. 14, 2014

(54) DTV WITH DETACHABLE HDMI INPUTS

(75) Inventor: Koji Kawashima, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 943 days.

(21) Appl. No.: 12/229,375

(22) Filed: Aug. 22, 2008

(65) Prior Publication Data
US 2010/0050228 A1 Feb. 25, 2010

(51) Int. Cl.
H04N 5/64 (2006.01)
H04N 21/4363 (2011.01)
H04N 21/436 (2011.01)
H04N 7/10 (2006.01)
H04N 21/41 (2011.01)
G09G 5/00 (2006.01)

(52) U.S. Cl.
CPC ... H04N 21/43615 (2013.01); H04N 21/43632 (2013.01); H04N 7/104 (2013.01); H04N 21/4122 (2013.01); H04N 7/106 (2013.01); G09G 5/006 (2013.01); G09G 2370/12 (2013.01); G09G 2370/047 (2013.01)
USPC .......................................... 348/843; 348/836

(58) Field of Classification Search
None
See application file for complete search history.

(56) References Cited

U.S. PATENT DOCUMENTS

| 7,200,683 | B1 | 4/2007 | Wang et al. | |
| 7,859,601 | B2* | 12/2010 | Kondo | 348/789 |
| 2007/0124424 | A1 | 5/2007 | Matsuda | |
| 2007/0285364 | A1 | 12/2007 | Nakagawa et al. | |
| 2007/0298656 | A1 | 12/2007 | He | |
| 2008/0068517 | A1* | 3/2008 | Urisu | 348/790 |
| 2008/0084834 | A1 | 4/2008 | Stanek | |
| 2008/0151113 | A1* | 6/2008 | Park | 348/500 |
| 2008/0165289 | A1* | 7/2008 | Furutani | 348/725 |
| 2008/0168519 | A1* | 7/2008 | Rao et al. | 725/127 |
| 2008/0297655 | A1* | 12/2008 | Kamida | 348/552 |
| 2009/0015723 | A1* | 1/2009 | Doumuki | 348/725 |
| 2010/0026912 | A1* | 2/2010 | Ho | 348/836 |

FOREIGN PATENT DOCUMENTS

JP 2008-067267 3/2008
KR 10-2008-0064222 9/2008

OTHER PUBLICATIONS

"Vastlane HDMI Switch 3:1 HDMI 1.3 Switch with intergrated CEC Functionality," Silicon Image, 2007.*

(Continued)

Primary Examiner — Mehrdad Dastouri
Assistant Examiner — James Anderson, II
(74) Attorney, Agent, or Firm — Miller Patent Services; Jerry A. Miller

(57) ABSTRACT

A television device has a television receiver residing substantially within a television receiver enclosure. A high definition multimedia interface is (HDMI) coupled to the television receiver. A detachable HDMI switch is operatively coupled to the HDMI interface, the HDMI switch and has at least two user-side HDMI buses connected thereto. The detachable HDMI switch resides in an HDMI switch housing that exposes the at least two user-side HDMI connector ports. The detachable HDMI switch housing is detachably connected to the television receiver enclosure to permit the HDMI switch housing to be either attached to the television receiver enclosure for use at the television receiver enclosure, or to permit the HDMI switch housing to be separated from the television receiver enclosure to permit the HDMI switch housing to be situated remotely from the television receiver enclosure so that the HDMI connector ports are remotely accessible while being selectable by the television device. This abstract is not to be considered limiting, since other embodiments may deviate from the features described in this abstract.

15 Claims, 5 Drawing Sheets

(56) References Cited

OTHER PUBLICATIONS

U.S. Appl. No. 12/056,039, Hironaka et al. filed Mar. 26, 2008.
"VastLane™ HDMI Switch 3:1 HDMI 1.3 Switch with Integrated CEC Functionality," Silicon Image, Inc., 2007.
"AT89C5ID2 High Performance 8-bit microcontroller 65Kbytes Flash, 2 Kbytes EEPROM and Two Wire Interface (TWI)," Atmel Products—Product Card, date unknown.
"User Manual Phillips DVD Player/Recorder, DVDR3400," Phillips, p. 17-18, 73, date unknown.
"Mitsubishi WD-57833 57" Diamond Series 1080p Rear-projection DLP HDTV; Crutchfield website, date unknown.
"HDTV UpConverter User Guide, Addendum and User Notes," Firmware version 1.8, Revised Apr. 7, 2004.
"CNET Editors' Review for Sony STR DA5300ES," Moskovciak et al, Updated Aug. 1, 2007.
"CM2030 Backdrive Protection and Isolation," California Micro Devices, 2007.
"Samsung, DVD Player, Setting Up the Display Options," date unknown.
Office Action, Japanese Application No. 2009-212400, Jan. 28, 2013, received on Mar. 8, 2013.
Office Action, Korean Application No. 10-2009-77845, Apr. 26, 2013, received on May 9, 2013.

* cited by examiner

DTV WITH DETACHABLE HDMI INPUTS

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The High Definition Multimedia Interface (HDMI) has become the connectivity interface of choice for modern audio/video (A/V) entertainment products. In particular, it has become common for a high definition television (HDTV) set to utilize many HDMI inputs for the purposes of receiving and controlling inputs from multiple video sources. It has also become more common the mount flat panel HDTV sets to a wall while keeping associated television set top boxes, digital video recorders (DVR—or personal video recorder—PVR), game consoles, etc. hidden in a home entertainment cabinet.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 2:
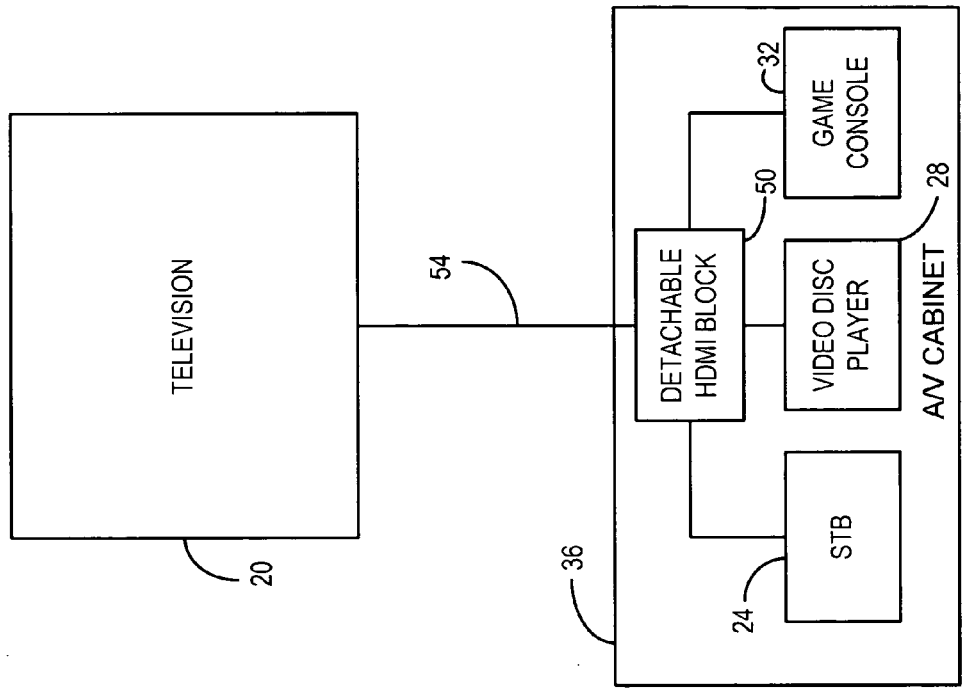
FIG. 2 is a block diagram of a home entertainment system including a television with a detachable HDMI block consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1:
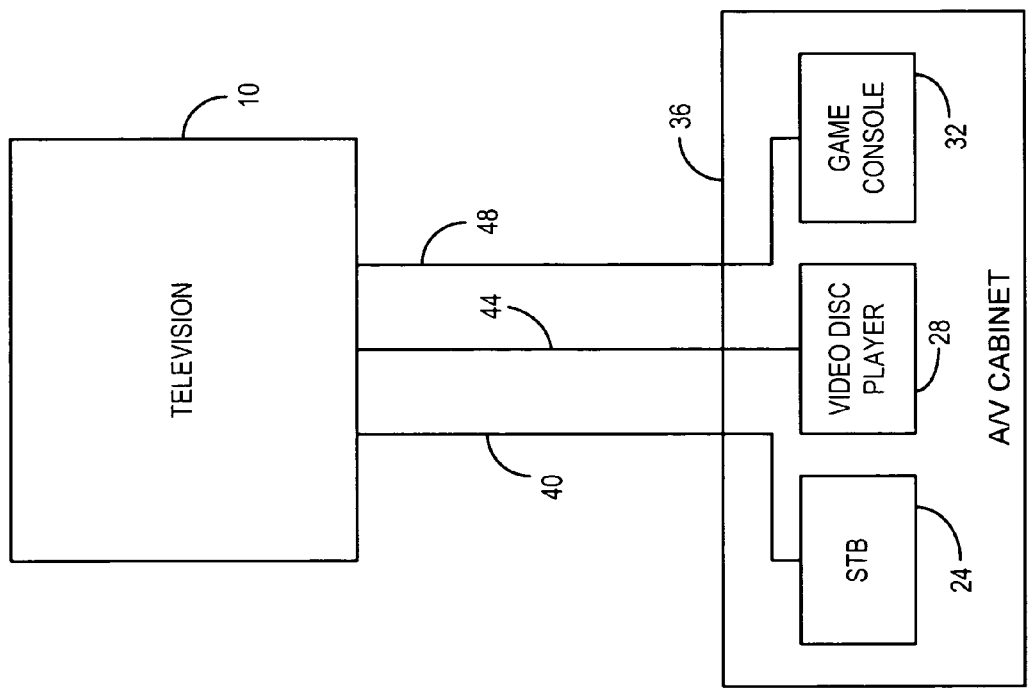
FIG. 1 is a block diagram of a home entertainment system consistent with certain embodiments of the present invention.

As previously noted HDMI has become the connectivity interface of choice for modern A/V entertainment products. In particular, it has become common for a HDTV set to utilize many HDMI inputs for the purposes of receiving and controlling inputs from multiple video sources. It has also become more common the mount flat panel HDTV sets to a wall while keeping associated television set top boxes, digital video recorders (DVR—or personal video recorder—PVR), game consoles, etc. hidden in a home entertainment cabinet. In such a case, as depicted in FIG. 1, the television set (or display) 10 may be suspended on a home's wall. If multiple interconnections are made to the television 10, from, for example, a STB 24, a DVD or other video disc player 28 and a game console 32 situated in another location such as an A/V cabinet 36, then multiple unsightly wires such as 40, 44 and 48 are needed along with power connections as possibly other connections to the television 10. Hiding such wiring within a wall can be an alternative, but this makes changing a configuration more complex and calls for modification of the structure of a home or apartment wall.

An aftermarket external HDMI switch can be used to help address this problem. In this case, one HDMI connection can be split into multiple connections at the switch. However, this presents additional cost to the consumer and makes selection among inputs more complex. In many television sets, the user can use the television remote control to select among the various HDMI connections available on the television and can even assign meaningful names to the connections (e.g., game, PVR, etc.). But, the television is generally only able to discern the difference between factory-installed HDMI connections, and cannot tell the difference between two HDMI connectors that are switched external to the TV into a single HDMI input. Once an external HDMI switch is connected to a television HDMI port, each port provided by the switch looks the same to the television. Thus, switching between devices connected to the external switch has to be done using separate controls (e.g., manually).

In accord with certain example implementations consistent with the present invention, two or more of the HDMI ports designed to be a part of the television can be used either as attached to the TV or can be detached so that it can be readily situated remotely to minimize the additional wiring required. In either case, the TV menu system can distinguish between all of the HDMI inputs whether connected or not. When the user wants to connect multiple devices to the TV, the user can detach HDMI input portion that is situated in its own housing so as to conveniently be able to hide many of the connections to other equipment. Hence, the housing containing the HDMI ports are detachable and can be situated adjacent the multiple devices that are connected thereto. This reduces the maze of wires to the TV set for multiple connections to a single cable. Moreover, the user's ability to control the HDMI ports via normal TV control is not hampered in any way.

This is depicted in FIG. 2, wherein the detachable HDMI block 50 in its own housing is removed from the television 20 to permit a single connection 54 to be used to interconnect the television 20 to STB 24, video disc player 28 and game console 32 (in this example). Note that it still may be desirable to provide HDMI inputs (and/or other input ports) to be available readily to the user at the television 20 to facilitate temporary connection of devices such as game consoles or video cameras directly.

Figure 3:
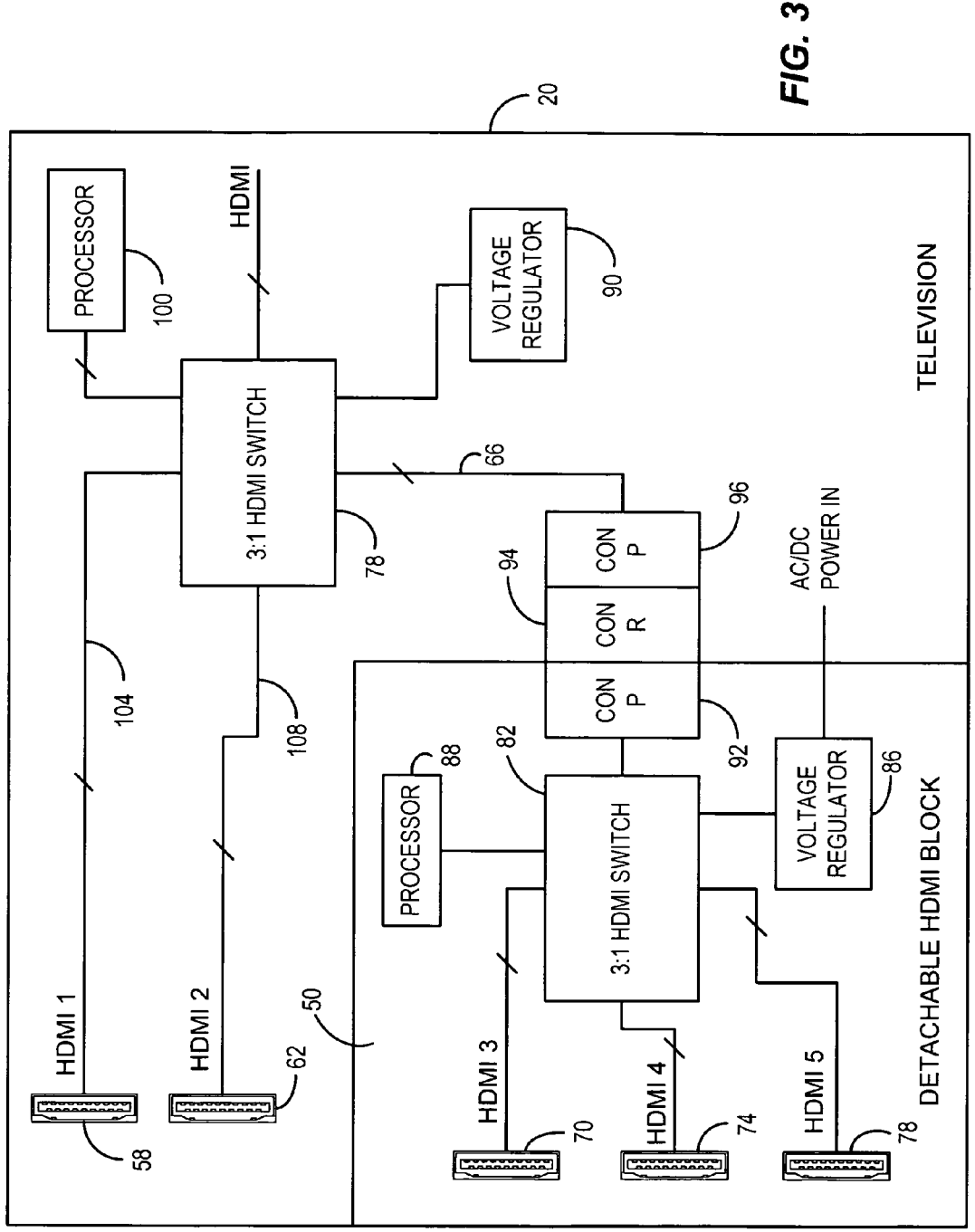
FIG. 3 is a block diagram of relevant portions of an example implementation of a television receiver having a detachable HDMI block consistent with certain embodiments of the present invention.

FIG. 3 depicts one example embodiment of a portion of a television 20 utilizing a detachable HDMI block as previously described. In this example, the television 20 retains two permanently attached user-side HDMI ports, (1 and 2) 58 and 62, and the detachable HDMI block 50 has three user-side HDMI ports (3, 4 and 5) 70, 74 and 78. In this implementation, a pair of 3:1 HDMI switch circuits (commercially available integrated circuits) 78 and 82 are used to configure a total of five user-available ports. The HDMI switch circuit 78 provides ports 58 and 62 for direct access by the user at the television set, and provides its third output 66 to the detachable HDMI block 50. HDMI switch circuits such as 78 and 82 provide switching of the HDP, TDMS and DDC signals between a plurality of ports (in this example case, between one of three user-side ports to one television side port).

At the detachable HDMI block 50, output 66 is provided to the second 3:1 HDMI switch circuit 82. Switch circuit 82 breaks this HDMI output 66 into three HDMI ports 70, 74 and 78 under control of the detachable HDMI block's processor 88 which are available either at the detachable HDMI block 50 while connected to the television 20, or while detached. When detached, a separate source for AC or DC power may be used to feed a voltage regulator 86 so that a separate "power block" may be used when detached. Alternatively, the AC or DC power may be supplied through a specialized cabling system from the television without limitation. The switch circuit 78 (and in certain implementations switch circuit 82) can be powered by a voltage regulator 90 situated within the television set's enclosure. Voltage regulator 86 is shown situated within the detachable HDMI block, but may be unnecessary if power is supplied through the television set's power supply, or may be externally connected when the detachable HDMI block 50 is detached from the television set 20.

A more or less standard HDMI bus provides signals to each of the HDMI connectors such as buses 104 and 108 to HDMI ports 58 and 62, as will be shown in greater detail later. At this point, it is useful to note that this embodiment uses two 3:1 switches, but this should not be considered limiting since any other suitable switch configuration can also be used. For example, a single 5:1 switch can be used to provide similar functionality, with three detachable connections and two fixed connections. Moreover, in other configurations, all of the HDMI input ports can be detachable or other combinations can be provided (e.g. at least two detachable and any number that remain on the television set that are not detachable).

A programmed processor 100 such as a microcontroller oversees operation of the HDMI switches 78 and 82 primarily via communication over an I2C ($I^2C$) bus in this implementation. Other implementations are also possible. In accord with certain implementations, the processor 100 functions to boot up the switch circuit, set the port, handle EDID and provide IC2 control functions as well as any other control or oversight functions needed in the HDMI switches. The television knows which of the three detached HDMI ports are being used at any given time by mechanisms defined in the HDMI specification including the CEC option.

Any number of mechanical and electrical schemes can be used to detachably connect the HDMI block 50 to television 20. As depicted a set of connectors 92, 94 and 96 are used to mate the detachable HDMI block 50 to television 20 when the detachable HDMI block 50 is connected to the television 20. This connector system is partially replaced by a suitable cable in place of connector R 94 when the detachable HDMI block 50 is detached from the television. In other embodiments, a retractable or permanent or detachable cable can be used for all connections between the television 20 and the detachable HDMI block 50. Many variations are possible without departing from embodiments consistent with the present invention and will occur to those skilled in the art upon consideration of the present teachings. In the figures, the letter "P" is used to denote a "plug" and the letter "R" is used to denote a "receptacle", but any other connector arrangement that serves similar purposes can be utilized without departing from embodiments consistent with the present invention.

Figure 4:
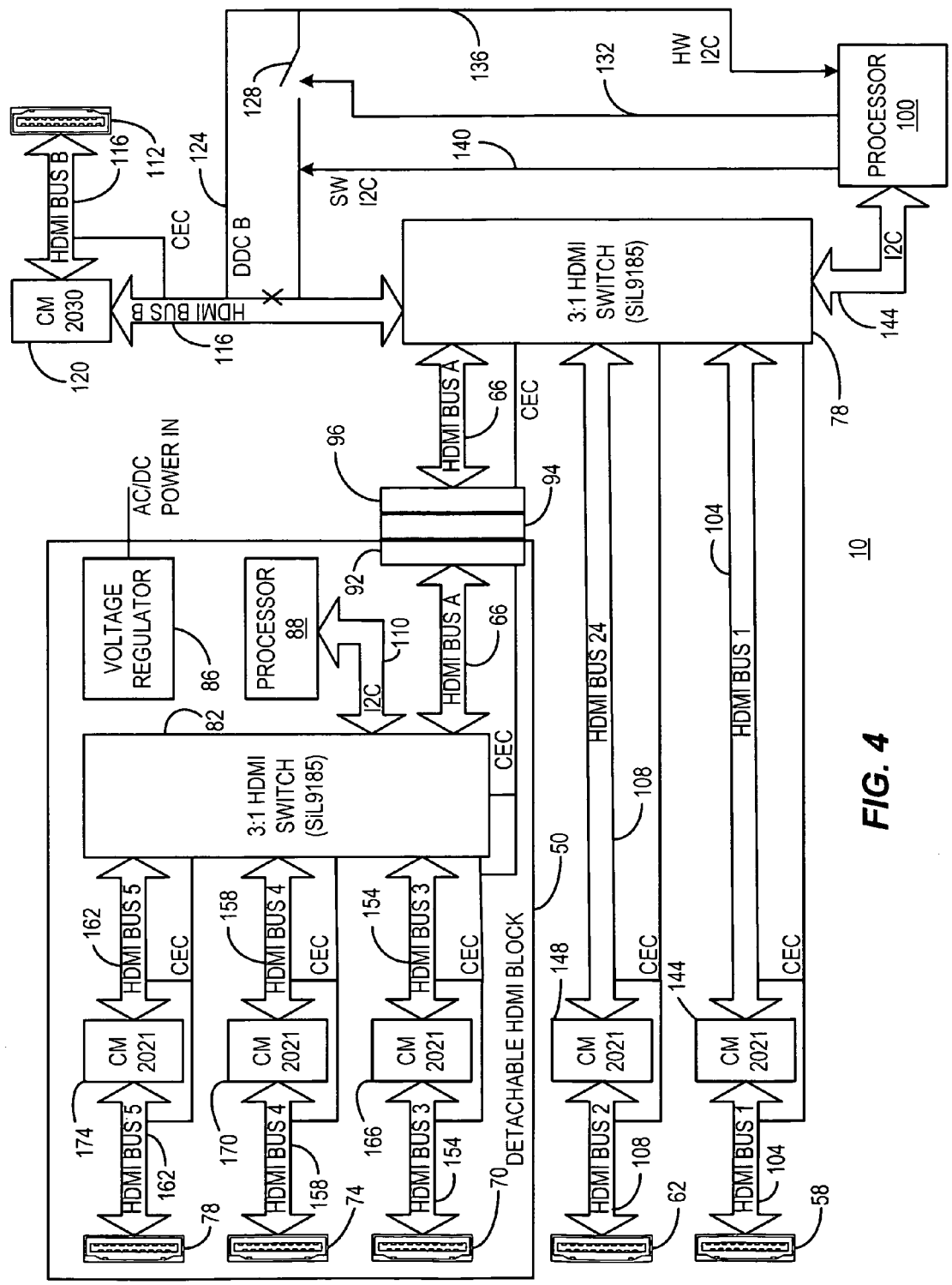
FIG. 4 is a more detailed diagram of an example implementation of a television receiver having a detachable HDMI block consistent with certain embodiments of the present invention.

Referring now to FIG. 4, an example implementation of an embodiment of a television receiver device with a detachable HDMI block is depicted in greater detail. In this example, commercially available circuits are shown to more clearly illustrate the example, and the interconnection thereof is shown in greater detail. It should be noted that this illustration is inverted when compared with the illustration of FIG. 3 for ease of illustration, such that the HDMI buses are numbered opposite from top to bottom of the prior illustration. The particulars of the various HDMI signals passed in the HDMI bus are documented in the HDMI specification and need not be repeated herein, but the standard abbreviations for the signals will be used to designate such signals where discussion is provided.

In this implementation, 3:1 HDMI switch devices such as the commercially available SiL9185 from Silicon Image of Sunnyvale, Calif. are used for switches 78 and 82. The HDMI circuitry depicted in the drawing interfaced to the television receiver in a more or less conventional manner, with such interface being depicted at 112 (not to imply that an HDMI connector per se is used. An HDMI bus 116 supplies the input to the circuitry shown with the bus passing through an HDMI transmitter port protection and interface device 120 such as the commercially available CM 2030 circuit available from California Micro Devices, Milpitas, Calif. Such devices are commonly used in HDMI interfaces in order to provide functions such as level shifting, isolation, overcurrent output protection and backdrive protection. The HDMI CEC signal is shown to be jumpered to bypass the interface device 120 in this circuit in order to control access to the EEPROM, but other embodiments may be implemented using other techniques The HDMI bus 116 is connected between interface device 120 and the HDMI switch circuit 78. The HDMI DDC signal 124 is interrupted and passed through a switch 128 as depicted by the "X" in the HDMI bus 116 in the drawing. Switch 128 is normally open and is closed under control of processor 100 using control line 132. This switch 128's operation controls the hardware DCC signal 136 at the HDMI interface hardware of the television, and a replacement signal from processor 100 is provided at 140. The processor captures and transfers the EDID information from the DDC signals of the I2C bus. The DDC (display data channel) signal is therefore received by processor 100 and processed therein to support optional high speed operations and the Enhanced Digital Data Channel data.

In the implementation depicted, the processor 100 operates using an I2C bus 144 connected to the HDMI switch circuit 78's I2C bus interface in order to manage operation of the HDMI switch circuit 78. As described previously, HDMI bus 104 and 108 are provided directly out in this implementation to user-side ports 58 and 62, except that for this implementation the buses are passed through port protection and interface circuits 144 and 148 respectively which can be realized, for example, using commercially available CM2021 devices from California Micro Devices, Milpitas, Calif. Again, in each case the CEC lines are jumpered across these devices 144 and 148 for the same reason previously discussed.

The third of the HDMI buses from switch 78 drives the detachable HDMI block through either a cable or connectors. While not shown, in this drawing to avoid clutter, port protection and interface circuits may be provided between the connector and the HDMI switches if needed at one or both sides of the detachable HDMI block's connectors 92 and 96.

Within the detachable HDMI block 50, the switch 82 receives the HDMI bus 66 and switches this bus to one of the three HDMI bus output buses 154, 158 and 162 to ultimately connect to the user-side ports 70, 74 and 78. Each of buses 154, 158 and 162 is passed through a port protection and interface circuit 166, 170 and 174 with the CEC line jumpered as in the prior port protection and interface buses in this implementation. The HDMI switch circuit 82 is controlled by processor 88 via I2C bus 110 in essentially the same manner that processor 100 controls HDMI switch 78. The CEC line from outside the detachable HDMI block is passed through the connectors 92, 94 and 96 to switch 82 and to all of the output buses, bypassing the protections circuits 166, 170 and 174 as shown.

Figure 5:
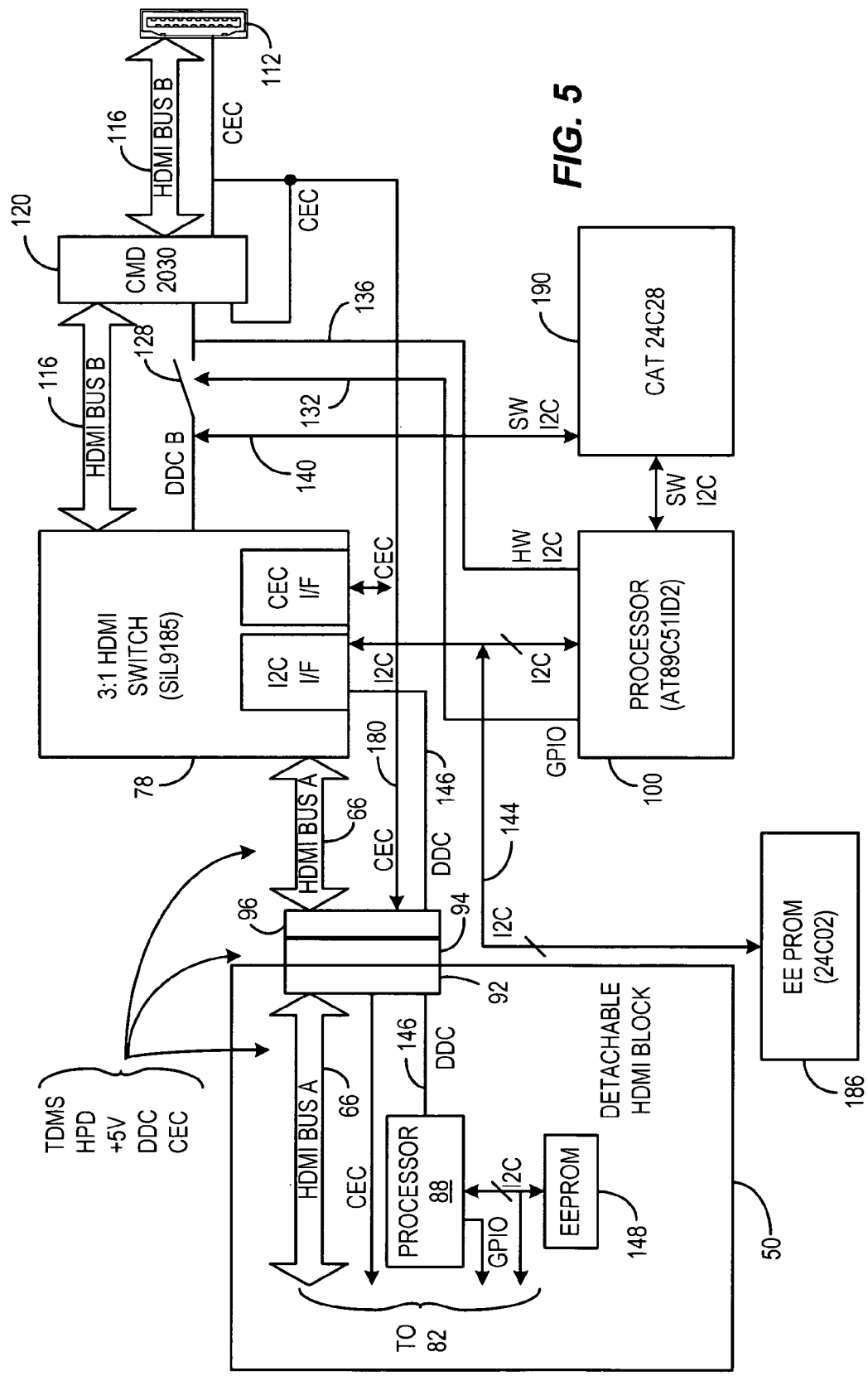
FIG. 5 is another diagram detailing another portion of the example detachable HDMI block circuitry consistent with certain embodiments of the present invention.

In another implementation, the removable block can be realized as the portion of FIG. 4 between 112 and 96 so as to provide three detachable HDMI port connections (with suitable circuit modifications to protect the third port). Other arrangements with more or fewer HDMI ports can be readily devised using, for example, by use of 4:1 switch arrangements, or other combinations without departing from embodiments consistent with the present invention. FIG. 5 provides a more complete depiction of the present implementation showing the CEC 180 interconnection and processor support circuitry partially broken out for clarity. In this drawing, the CEC line is connected continuously from interface 112 and protection Circuit 120 to the CEC interface of the HDMI switch 78 and is then passed through the connectors 96, 94 and 92 to the detachable HDMI switch 82 where it is passed to the HDMI switch and to each of the three HDMI buses 154, 158 and 162 as shown in FIG. 4 and on to their respective user-side ports. The I2C bus from processor 100 also interfaces to the I2C interface of switch 78, but it is not necessary in this implementation to connect the I2C bus through connectors 96, 94 and 92 to switch 78 because the I2C control for IC 78 is done by vendor unique codes for monitor control. The SiL9185 is but one commercially available switch that could be used for realizing implementations consistent with the present invention, and should not be considered limiting to the invention.

The processors 88 and 100 can be realized using, for example, a commercially available microcontroller such as an AT89C51ID2 microcontroller from Atmel Corporation of San Jose, Calif., or similar processors. The processor 100 may be further coupled to external memory such as an EEPROM 186 (also referred to as an EE PROM, or an E2PROM) to supply programming and data storage capacity. The control line 132 that controls switch 128 can be implemented using the GPIO signal from the above-referenced. Atmel microcontroller. The processor generated DDC signal 140 can be passed through an EEPROM circuit 190 such as a commercially available CAT 24C28 EEPROM available from Catalyst Semiconductor, Inc. of Santa Clara, Calif.

Figure 6:
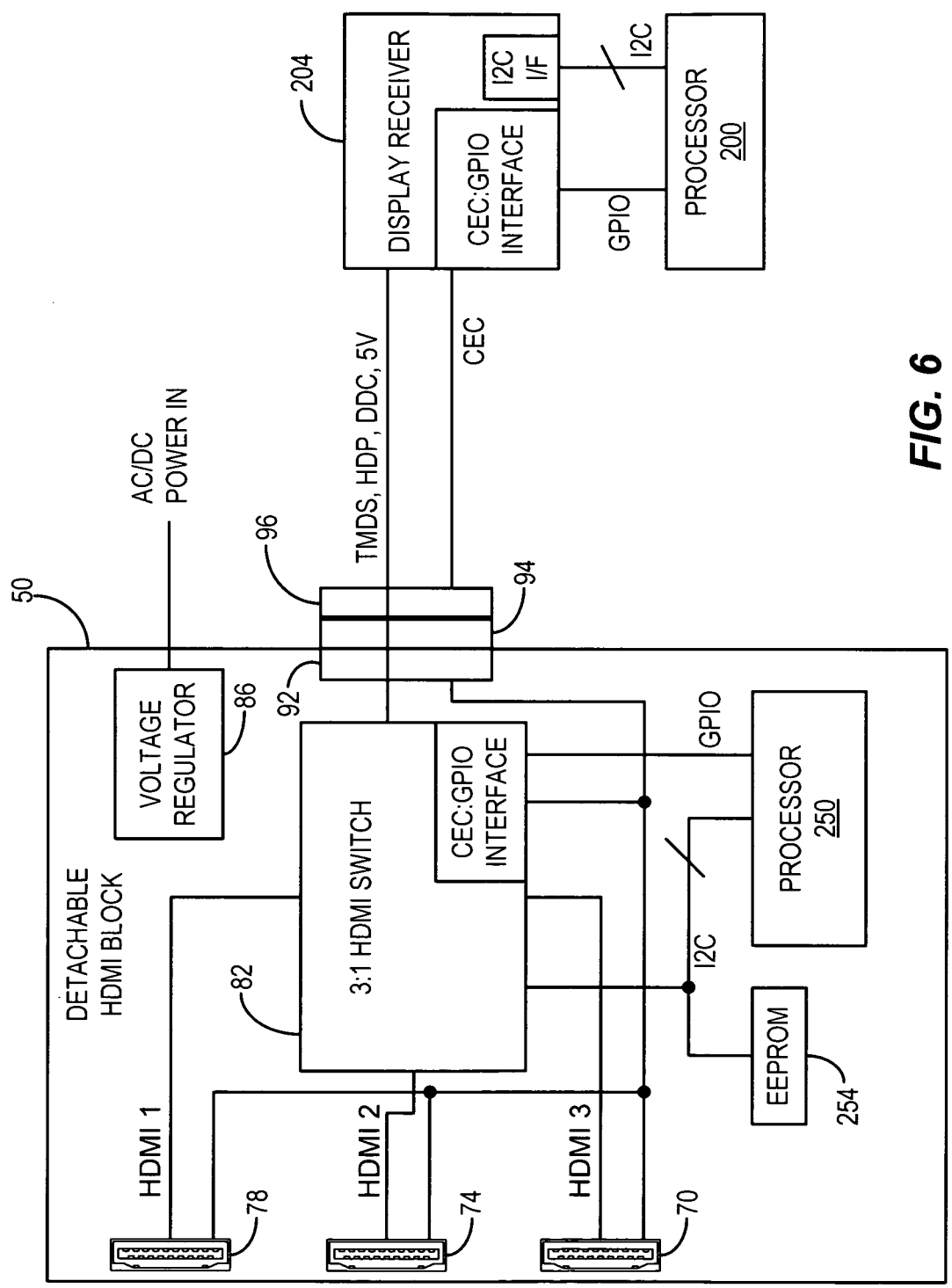
FIG. 6 is another implementation of the detachable HDMI block consistent with certain embodiments of the present invention.

Within the detachable HDMI block 50, the switch 82 may not be able to readily access the EEPROM 186. In one implementation, this problem can be overcome by use of processor 88 of the detachable HDMI block 50, which has its own associated EEPROM 148. In this implementation, processor 88 is coupled to EEPROM 148 via an I2C bus which is coupled to the DDC signal 146 of the switch 78 and produces a simulated EDID. In this case, processor 88 manages control of switch 82 via the GPIO signals and EDID data transfer, and hence there is no need for processor 100 to manage switch 82 of the detachable HDMI block 50. Referring now to FIG. 6, a simplified implementation example is presented in which the detachable HDMI block 50 incorporates a 3:1 HDMI switch 82 as in the prior examples which controls switching among three HDMI input ports 70, 74 and 78 (the full details of the CEC control and input protection circuits are omitted for ease of illustration). In this example, the display receiver operates under control of a processor 200 (with associated support circuitry) via the I2C bus and GPIO signal, wherein the processor 200 is situated external to the detachable HDMI block. Processor 250 is situated inside the HDMI block and operates in cooperation with EEPROM 254 to handle register setting, EDID data transfer and such functions. Processor 200 is interfaced to the display's receiver 204 via the I2C bus, and the signals TMDS, HDP, DDC, CEC and 5 Volts are passed to/from the receiver 204 through the connector arrangement 92, 94 and 96 to the detachable HDMI block 50. When detachable HDMI block 50 is detached from the television receiver device as previously described, the television receiver device is still able to distinguish among the various (three in this example) HDMI inputs. Thus, the user can readily control the selection of an input source via the remote commander for the television receiver in a seamless manner. Voltage regulator 86 is provided and has the same functionality as previously described. The CEC signal is passed through the connectors 92, 94 and 96 to the CEC interface of the switch 82 and is passed along from there to the HDMI input ports 70, 74 and 78. Processor 250 is interfaced at the CEC:GPIO interface of switch 82 via both the I2C bus and the GPIO signal. When the detachable HDMI block is detached, processor 200 controls the detachable HDMI switch block 50 through the CEC signal that is passed through the connectors which is passed along to the processor 250 for control of the switch circuit 82. The GPIO interconnection between switch 82 and processor 250 is used for CEC control command sending and receiving. While the above-described functionality is originally proposed for use in a television set. It can also be implemented in any device having a television receiver, or any device used to receive multiple HDMI signals such as a STB or A/V switch. Moreover, although discussed in terms of an HDMI signal, the invention is not exclusively limited thereto. For example, in addition to ports, the detachable HDMI switch device can further incorporate other analog or digital format interfaces that can be tethered to the television receiver device using a specialized cable to carry HDMI, S-video, analog formats, optical or other non-HDMI format interfaces and connectors useful for communication in a home entertainment environment. Additionally, while the present discussion has focused upon use of HDMI connections, other connections can be used.

Thus, in accordance with certain example implementations, a television device has a television receiver residing substantially within a television receiver enclosure; A high definition multimedia interface is (HDMI) coupled to the television receiver A detachable HDMI switch is operatively coupled to the HDMI interface, the HDMI switch having at least two user-side HDMI buses connected thereto. The detachable HDMI switch resides in an HDMI switch housing that exposes the at least two user-side HDMI connector ports. The detachable HDMI switch housing is detachably connected to the television receiver enclosure to permit the HDMI switch housing to be either attached to the television receiver enclosure for use at the television receiver enclosure, or to permit the HDMI switch housing to be separated from the television receiver enclosure to permit the HDMI switch housing to be situated remotely from the television receiver enclosure so that the HDMI connector ports are remotely accessible while being selectable by the television device.

In certain implementations, a cable couples the detachable HDMI switch to the television receiver enclosure. In certain implementations, the cable comprises an HDMI cable. In certain implementations, an HDMI switch is coupled to the television receiver residing in the television receiver housing and having at least one user-side HDMI connector port that is accessible from outside the television receiver enclosure. In certain implementations, the HDMI switch residing in the television receiver enclosure has a second HDMI port that is coupled to the detachable HDMI switch to permit the detachable HDMI switch to couple to the HDMI interface of the television receiver via the second HDMI port. In certain implementations, a processor resides within the television device enclosure, wherein the processor controls operation of the HDMI switch residing in the television receiver enclosure. In certain implementations, the processor captures and transfers the EDID information from the DDC signals of the I2C bus. In certain implementations, the processor controls the state of a switch that either passes the DDC signals directly between the HDMI interface coupled to the television receiver and the HDMI switch residing in the television receiver enclosure, or passes the processed HDMI DDC signals between the HDMI switch residing in the television receiver enclosure and the HDMI switch residing in the television receiver enclosure. In certain implementations, a non-HDMI connector is attached to the detachable HDMI switch housing and exposed for user access thereto, and wherein the non-HDMI connector is operatively coupled to the television receiver via an interface.

In certain implementations, a television device has a television receiver residing substantially within a television receiver enclosure. A high definition multimedia interface (HDMI) is coupled to the television receiver. A detachable HDMI switch operatively coupled to the HDMI interface, the HDMI switch having at least two user-side HDMI buses connected thereto. The detachable HDMI switch resides in an HDMI switch housing that exposes the at least two user-side HDMI connector ports. The detachable HDMI switch housing is detachably connected to the television receiver enclosure to permit the HDMI switch housing to be either attached to the television receiver enclosure for use at the television receiver enclosure, or to permit the HDMI switch housing to be separated from the television receiver enclosure to permit the HDMI switch housing to be situated remotely from the television receiver enclosure so that the HDMI connector ports are remotely accessible while being selectable by the television device. A cable couples the detachable HDMI switch to the television receiver enclosure when the HDMI switch housing is detached from the television receiver enclosure. An HDMI switch is coupled to the television receiver residing in the television receiver housing and has at least one user-side HDMI connector port that is accessible from outside the television receiver enclosure. A processor resides within the television device enclosure, wherein the processor controls operation of the HDMI switch residing in the television receiver enclosure.

In certain implementations, the cable comprises an HDMI cable. In certain implementations, the HDMI switch resides in the television receiver enclosure has a second HDMI port that is coupled to the detachable HDMI switch to permit the detachable HDMI switch to couple to the HDMI interface of the television receiver via the second HDMI port. In certain implementations, the processor captures and transfers the EDID information from the DDC signals of the I2C bus. In certain implementations, the processor controls the state of a switch that either passes the DDC signals directly between the HDMI interface coupled to the television receiver and the HDMI switch residing in the television receiver enclosure, or passes the processed HDMI DDC signals between the HDMI switch residing in the television receiver enclosure and the HDMI switch residing in the television receiver enclosure. In certain implementations, a non-HDMI connector is attached to the detachable HDMI switch housing and exposed for user access thereto, and wherein the non-HDMI connector is operatively coupled to the television receiver via an interface.

In other implementations, a television device has a television receiver residing substantially within a television receiver enclosure. An interface is coupled to the television receiver for receiving inputs from a plurality of input ports. A detachable port switch is operatively coupled to the interface, the port switch having at least two user-side ports connected thereto. The detachable port switch housing is detachably connected to the television receiver enclosure to permit the port switch housing to be either attached to the television receiver enclosure for use at the television receiver enclosure, or to permit the port switch housing to be separated from the television receiver enclosure to permit the port switch housing to be situated remotely from the television receiver enclosure so that the connector ports connector ports are remotely accessible while being selectable by the television device.

In certain implementations, a cable couples the detachable port switch to the television receiver enclosure. In certain implementations, a port switch coupled to the television receiver residing in the television receiver housing and having at least one user-side connector port that is accessible from outside the television receiver enclosure. In certain implementations, the port switch residing in the television receiver enclosure has a second port that is coupled to the detachable port switch to permit the detachable port switch to couple to the port interface of the television receiver via the second port. In certain implementations, a processor resides within the television device enclosure, wherein the processor controls operation of the port switch residing in the television receiver enclosure.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television device, comprising:
   a television receiver residing substantially within a television receiver enclosure;
   a television processor residing within the television receiver enclosure;
   a television memory residing within the television receiver enclosure and in communication with the television processor;
   the television memory storing extended display identification (EDID) information;
   a television high definition multimedia interface (HDMI) coupled to the television receiver and operating under control of the television processor;
   a detachable HDMI switch operatively coupled to the television HDMI interface, the detachable HDMI switch having at least two user-side HDMI buses connected thereto with each having a user side connector port;
   the detachable HDMI switch residing in a detachable HDMI switch housing that exposes the at least two user-side HDMI connector ports;
   a switch processor residing substantially within the detachable HDMI switch housing;
   an switch memory residing substantially within the detachable HDMI switch housing and in communication with the switch processor;
   the switch memory storing a simulated EDID information produced by the switch processor in response to display data channel (DDC) signals from the television HDMI interface;
   the at least two user-side HDMI buses having a common consumer electronic control (CEC) connection with the television HDMI interface;
   where the switch processor oversees operation of the at least two user-side HDMI buses so as to distinguish between the at least two user side HDMI ports;
   where the television processor residing within the television receiver oversees operation of the television HDMI interface; and
   where the detachable HDMI switch housing is detachably mechanically attached to the television receiver enclosure to permit the detachable HDMI switch housing to be either mechanically attached to the television receiver enclosure for use at the television receiver enclosure, or to permit the HDMI switch housing to be mechanically separated from the television receiver enclosure to permit the HDMI switch housing to be situated remotely from the television receiver enclosure so that the HDMI connector ports are remotely accessible while being selectable and distinguishable by the television device.

2. The television device according to claim 1, further comprising a cable coupling the detachable HDMI switch to the television receiver enclosure.

3. The television device according to claim 2, wherein the cable comprises an HDMI cable.

4. The television device according to claim 1 further comprising an HDMI switch coupled to the television receiver residing in the television receiver enclosure and having at least one user-side HDMI connector port that operates under control of the television processor and that is accessible from outside the television receiver enclosure.

5. The television receiver device according to claim 4, wherein the HDMI switch residing in the television receiver enclosure has a second HDMI port that is coupled to the detachable HDMI switch to permit the detachable HDMI switch to couple to the HDMI interface of the television receiver via the second HDMI port.

6. The television receiver device according to claim 5, wherein the television processor communicates with the switch processor using a common bus connection.

7. The television receiver device according to claim 6, wherein the television processor controls the state of a switch that either passes the DDC signals directly between the HDMI interface coupled to the television receiver and the HDMI switch residing in the television receiver enclosure, or passes the processed HDMI DDC signals between the HDMI switch residing in the television receiver enclosure and the HDMI switch residing in the HDMI switch housing.

8. The television receiver device according to claim 1, further comprising a non-HDMI connector attached to the detachable HDMI switch housing and exposed for user access thereto, and wherein the non-HDMI connector is operatively coupled to the television receiver via an interface.

9. A television device, comprising:
   a television receiver residing substantially within a television receiver enclosure;
   a television high definition multimedia interface (HDMI) coupled to the television receiver;
   a detachable HDMI switch operatively coupled to the HDMI interface, the HDMI switch having at least two user-side HDMI buses connected thereto with each user-side HDMI bus having a user-side HDMI connector port;
   the detachable HDMI switch residing in a detachable HDMI switch housing that exposes the at least two user-side HDMI connector ports;
   a switch processor residing substantially within the detachable HDMI switch housing;
   an switch memory residing substantially within the detachable HDMI switch housing and in communication with the switch processor;

the switch memory storing a simulated EDID information produced by the switch processor in response to display data channel (DDC) signals from the television HDMI interface;

the switch processor having a common bus connection with the HDMI interface;

where the detachable HDMI switch housing is detachably mechanically attached to the television receiver enclosure to permit the detachable HDMI switch housing to be either mechanically attached to the television receiver enclosure for use at the television receiver enclosure, or to permit the HDMI switch housing to be mechanically separated from the television receiver enclosure to permit the HDMI switch housing to be situated remotely from the television receiver enclosure so that the HDMI connector ports are remotely accessible while being selectable by the television device;

a cable coupling the detachable HDMI switch to the television receiver enclosure when the HDMI switch housing is detached from the television receiver enclosure;

an HDMI switch coupled to the television receiver residing in the television receiver housing and having at least one user-side HDMI connector port that is accessible from outside the television receiver enclosure; and a television processor residing within the television device enclosure, wherein the television processor controls operation of the HDMI switch residing in the television receiver enclosure, the HDMI interface and the switch processor of the detachable HDMI switch, and where the switch processor residing within the HDMI switch housing oversees operation of the at least two user-side HDMI buses.

10. The television device according to claim 9, wherein the cable comprises an HDMI cable.

11. The television receiver device according to claim 9, wherein the HDMI switch residing in the television receiver enclosure has a second HDMI port that is coupled to the detachable HDMI switch to permit the detachable HDMI switch to couple to the HDMI interface of the television receiver via the second HDMI port.

12. The television receiver device according to claim 9, wherein the television processor communicates with the switch processor using a common bus connection.

13. The television receiver device according to claim 9, wherein the television processor controls the state of a switch that either passes the DDC signals directly between the HDMI interface coupled to the television receiver and the HDMI switch residing in the television receiver enclosure, or passes the processed HDMI DDC signals between the HDMI switch residing in the television receiver enclosure and the HDMI switch residing in the HDMI switch housing.

14. The television receiver device according to claim 9, further comprising a non-HDMI connector attached to the detachable HDMI switch housing and exposed for user access thereto, and wherein the non-HDMI connector is operatively coupled to the television receiver via an interface.

15. A television device, comprising:
a television receiver residing substantially within a television receiver enclosure;
a high definition multimedia interface (HDMI) coupled to the television receiver;
a detachable HDMI switch operatively coupled to the HDMI interface, the HDMI switch having at least two user-side HDMI buses connected thereto;
the at least two user-side HDMI buses having a common consumer electronic control (CEC) connection with the HDMI interface;
the detachable HDMI switch residing in an HDMI switch housing that exposes the at least two user-side HDMI connector ports;
wherein the detachable HDMI switch housing is detachably mechanically attached to the television receiver enclosure to permit the detachable HDMI switch housing to be either attached to the television receiver enclosure for use at the television receiver enclosure, or to permit the HDMI switch housing to be mechanically separated from the television receiver enclosure to permit the detachable HDMI switch housing to be situated remotely from the television receiver enclosure so that the HDMI connector ports are remotely accessible while being selectable by the television device;
an HDMI cable coupling the detachable HDMI switch to the television receiver enclosure when the detachable HDMI switch housing is detached from the television receiver enclosure and makes a common CEC connection;
an HDMI switch coupled to the television receiver residing in the television receiver housing and having at least one user-side HDMI connector port that is accessible from outside the television receiver enclosure;
wherein the HDMI switch residing in the television receiver enclosure has a second HDMI port that is coupled to the detachable HDMI switch to permit the detachable HDMI switch to couple to the HDMI interface of the television receiver via the second HDMI port;
a non-HDMI connector attached to the detachable HDMI switch housing and exposed for user access thereto, and wherein the non-HDMI connector is operatively coupled to the television receiver via an interface;
a television processor residing within the television device enclosure, wherein the television processor controls operation of the HDMI switch residing in the television receiver enclosure the HDMI interface, and where the television processor residing within the television receiver oversees operation of the at least two user-side HDMI buses residing within the television receiver enclosure so that the television processor can distinguish between the at least two user-side HDMI buses;
a television memory residing within the television receiver enclosure and in communication with the television processor;
the television memory storing extended display identification (EDID) information;
a switch processor residing substantially within the detachable HDMI switch housing;
an switch memory residing substantially within the detachable HDMI switch housing and in communication with the switch processor;
the switch memory storing a simulated EDID information produced by the switch processor in response to display data channel (DDC) signals from the television HDMI interface; and
wherein the television processor controls the state of a switch that either passes the DDC signals directly between the HDMI interface coupled to the television receiver and the HDMI switch residing in the television receiver enclosure, or passes the processed HDMI DDC signals between the HDMI switch residing in the television receiver enclosure and the switch processor residing in the detachable HDMI switch housing.

* * * * *